United States Patent [19]

Olifer et al.

[11] 4,224,077

[45] Sep. 23, 1980

[54] RAW MIX FOR THE PRODUCTION OF PORTLAND CEMENT CLINKER

[76] Inventors: Vladimir P. Olifer, ulitsa Lenina, 14, kv. 4; Sergei P. Berezkin, ulitsa Lenina, 7, kv. 12, both of Nikolaevskaya oblast, poselok Olshanskoe; Pavel N. Galkin, ulitsa 40 let Sovetskoi Ukrainy, 78, kv. 32, Zaporozhie; Anatoly I. Ternovoi, ulitsa Florentsii, 9, kv. 9, Kiev; Alexandr A. Rogatkin, ulitsa 40 let Sovetskoi Ukrainy, 76, kv. 3, Zaporozhie; Nikolai I. Stovba, Strategicheskoe shosse, 11, kv. 16, Kiev; Lev P. Feofanov, ulitsa 40 let Sovetskoi Ukrainy, 82, kv. 130; Leonid P. Khlopkov, ulitsa 40 let Sovetskoi Ukrainy, 24, kv. 11, both of Zaporozhie; Anna I. Tryastsina, ulitsa Lenina, 13, kv. 26, Nikolaevskaya oblast, poselok Olshanskoe; Lidia I. Lekalova, ulitsa 40 let Sovetskoi Ukrainy, 58, kv. 39, Zaporozhie; Larisa A. Telina, ulitsa Nemirovicha-Danchenko, 14, Zaporozhie; Vera I. Mikheeva, ulitsa Patrioticheskaya, 58, kv. 115, Zaporozhie, all of U.S.S.R.

[21] Appl. No.: 34,652

[22] Filed: Apr. 30, 1979

[30] Foreign Application Priority Data

May 10, 1978 [SU] U.S.S.R. ................. 2606851

[51] Int. Cl.$^2$ ............................................... C04B 7/38
[52] U.S. Cl. .................................... 106/100; 106/103
[58] Field of Search ............................ 106/100, 103

[56] References Cited

U.S. PATENT DOCUMENTS

| 3,442,498 | 5/1969 | Davis | 106/103 |
| 3,759,730 | 9/1973 | Trief | 106/103 |
| 4,119,467 | 10/1978 | Nudelman et al. | 106/100 |

*Primary Examiner*—James Poer
*Attorney, Agent, or Firm*—Lackenbach, Lilling & Siegel

[57] ABSTRACT

A raw mix for the production of portland cement mix consists of a lime component, a clay component, an iron-containing component, and a modifying additive comprising hydrolysis and yeast production waste liquors and products of neutralization of chlorine-containing off-gas from titanium and magnesium production, with the following proportioning of the components (% by weight):

| | |
|---|---|
| lime component | 50–52 |
| clay component | 7.5–10 |
| iron-containing component | 1–1.5 |
| hydrolysis and yeast production waste liquors | 30–38 |
| products of neutralization of chlorine-containing off-gas from titanium and magnesium production | 1–9. |

The raw mix according to the invention exhibits improved physico-chemical and mechanical properties. Fluidity of the mix is from 58 to 60 mm, the degree of decarbonization is as high as 18%. Clinker prepared from the mix according to the invention has a strength of from 550 to 560 kgf/cm$^2$, and the roasting temperature is 80°–140° C. lower.

3 Claims, No Drawings

4,224,077

RAW MIX FOR THE PRODUCTION OF PORTLAND CEMENT CLINKER

The invention relates to raw mixes for the production of portland cement clinker.

FIELD OF THE ART

Such clinker is widely used in the manufacture of highgrade cements.

Basic starting materials for the production of portland cement clinker include lime and clay components, and various adjusting additives.

The additives are used as means for adjusting the properties of the raw mix, clinker and cement.

The knowledge of the mechanism of additives and their influence on the mechanical properties of clinker enables a diversification of properties of raw mixes and production of clinker exhibiting a complex of predetermined useful properties.

Thus, it is known to use such modifying additives as $CaCl_2$, $TiO_2$ and the like. These additives improve certain properties of a raw mix, such as plasticity and strength performance of clinker. They are, however, in a short supply and expensive. From the economical viewpoint, it is expedient to use production wastes as additives.

BACKGROUND OF THE INVENTION

Known in the art is a raw mix for the production of portland cement clinker, containing lime and clay components. The composition of this mix also includes an iron-containing component (cinder)—waste from chemical production, and a manganese concentrate for an adjustment of alumina and siliceous indexes. As modifying additives for such mixes, the use is made of e.g. blast-furnace dust which is the waste of blast-furnace metal production, waste of soda production containing up to 70% of $CaCl_2$.

These raw mixes are widely used. These mixes are used for the production of high-grade clinker. The introduction of additives improves the degree of mineralization, and intensifies the roasting process.

No one additives used can, however, impart to the raw mix and resultant clinker a complex of useful properties.

Known in the art is a raw mix for the production of portland cement clinker containing carbonate, clay and iron-containing components, and oxygen-containing chlorine compounds as a modifying additive with the following proportioning of the components (% by weight):

| lime component | 70–82 |
| clay component | 15–19 |
| pelletized secondary lead-zinc slag | 3–10 |
| oxygen-containing chlorine compound | 1–2 |

As oxygen-containing chlorine compounds, use is made of oxidizers: calcium chlorine, hypochlorite, and chlorate.

This raw mix exhibits a complex of useful properties and, moreover, the use of the above-mentioned additives enables a lowering of the roasting temperature in the process of the clinker production. The additive used cannot, however, ensure desired fluidity of a mix, required moisture content and adequate degree of decarbonization.

Clinker produced from this mix exhibits low strength.

SUMMARY OF THE INVENTION

It is an object of the invention to provide a raw mix which exhibits valuable properties; such as improved fluidity with minimum required moisture content, as well as an improved degree of mineralization.

In accordance with this and other objects, the invention resides in a mix containing a lime component, a clay component, an iron-containing component, and a modifying additive. According to the invention, the modifying component comprises hydrolysis and yeast production waste liquors and products of neutralization of chlorine-containing off-gas of titanium-magnesium production, with the following proportion of the components (% by weight):

| lime component | 50–52 |
| clay component | 7.5–10 |
| iron-containing component | 1–1.5 |
| hydrolysis and yeast production waste liquors | 30–38 |
| products of neutralization of chlorine-containing off-gas from titanium-manganese manufacture | 1–9 |

As the lime component, use may be made of, e.g. limestone, chalk, marl. As the clay component use may be made of various clays and loams. As the iron-containing component use may be made of pyrite cinder, ore dust.

As mentioned above, the modifying additive is made of hydrolysis and yeast production waste liquors and products of neutralization of chlorine-containing off-gas from titanium-magnesium production.

Hydrolysis and yeast production waste liquors are the wastes of yeast production plants, and have the following chemical composition (% by weight):

| organic compounds | 50–54 |
| ammonium nitrogen | 5–7 |
| $H_2CO_3$ | 2–3 |
| $P_2O_5$ | 1–1.5 |
| Mg | 1–2 |
| K | 0.3–0.8 |
| $Cl_{act.}$ | 1–2 |
| Ca | 2–3 |
| Na | 0.3–0.8 |
| $SO_4$ | 5–7 |
| water | the balance to 100. |

Products of neutralization of chlorine-containing off-gas of titanium-magnesium production comprise a 60–80% solution having the following chemical composition (% by weight):

| CaO | 15.8–31.2 | $Ca(ClO)_2$ | 5–5.8 |
| $CaCl_2$ | 12.5–16.2 | $CaCO_3$ | 1.7–2.5 |
| $Cl_{act.}$ | 9.5–17.1 | C | 2–6.0 |
| $TiO_2$ | 10.0–13.0 | FeO | 2.0–10.0 |
| $Al_2O_3$ | 7.04–10.0 | $SiO_2$ | 7.0–30.0 |
| MgO | 5.0–9.0 | Mn | 0.2–0.3 |
| $V_2O_5$ | 0.1–0.4 | $Cr_2O_3$ | 0.3–0.8 |
| S | 0.9–1.5 | water | the balance to 100. |

Content of chlorine up to 15–17% in the products of neutralization of chlorine-containing off-gas from titanium-magnesium production improves the degree of decarbonization of the raw mix at the stage of preparation of coarse sludge by 15–20%.

The presence of chlorine contributes also to the decomposition of organic compounds of hydrolysis and yeast production waste liquors. As a result, the fluidity of the mix increases by 3-5%. Moreover, owing to the presence of chlorine, calcium chloride is formed to intensify the roasting process.

The presence of other components in the products of neutralization of chlorine-containing off-gas has a positive effect on the properties of both raw mix and clinker. Thus $Al_2O_3$ contributes to the improvement of reactivity of the mix as it is present in the form of a free oxide. This results in improved strength characteristics of clinker.

The raw mix for the production of portland cement clinker according to the invention exhibits improved physicochemical and mechanical properties. Thus the fluidity of the mix is from 50 to 60 mm which is 3 to 5 mm better compared to the raw mix containing oxygen-containing chlorine compounds as an additive; the degree of decarbonization is also considerably improved (up to 12-18%).

Clinker produced from the raw mix according to the invention has an improved strength from 550 to 560 kgf/cm$^2$, the roasting temperature is lowered by 80°-140° C., the kiln output is improved by 2-3% and fuel consumption is reduced by 3-4%.

DETAILED DESCRIPTION OF THE INVENTION

The process for the preparation of a raw mix for the production of portland cement clinker is carried out as follows.

A lime component is preliminarily crushed in two stages: first, in a jaw breaker and than in a hammer mill. Then the comminuted lime component and a clay component are charged in a pre-set ratio into a rod mill, into which is also fed hydrolysis and yeast production waste liquors and products of neutralization of chlorine-containing off-gas of titanium and magnesium production. The resultant comminuted sludge is fed from the rod mill into a coarse sludge basin. The sludge is analyzed to determine the content of $CaCO_3$, $Al_2O_3$, $Fe_2O_3$, $SiO_2$ and Cl. The sludge is pumped from the basin into a ball mill, into which is also fed an iron-containing component. They are finely ground together.

For better understanding of the invention, specific examples are given below.

EXAMPLE 1

A raw mix for the production of portland cement clinker of the following composition (% by weight) was prepared:

| | |
|---|---|
| limestone | 50 |
| clay | 10 |
| ore dust | 1 |
| hydrolysis and yeast production waste liquors | 38 |
| products of neutralization of chlorine-containing off-gas from titanium and magnesium production | 1 |

Limestone was first comminuted in a jaw breaker and then, in a hammer mill. Clay and comminuted limestone were charged into a rod mill, to which were also fed hydrolysis and yeast production waste liquors and products of neutralization of chlorine-containing off-gas from titanium and magnesium production. The resultant comminuted sludge was fed to a coarse sludge basin and therefrom, to fine grinding ball mills to be comminuted together with ore dust to a pre-set fineness.

The resultant raw mix had the following properties:

| | |
|---|---|
| fluidity | 58 mm |
| moisture capacity | 39%. |

In the production of clinker from this mix, the temperature at which the clinker formation process was completed was lowered from 1500° C. to 1420° C. The strength of clinker produced using this raw mix was 550 kgf/cm$^2$.

EXAMPLE 2

A raw mix for the production of portland cement clinker of the following composition (% by weight) was prepared:

| | |
|---|---|
| limestone | 51 |
| clay | 8.5 |
| pyrite cinder | 1.0 |
| hydrolysis and yeast production waste liquors | 35.0 |
| products of neutralization of chlorine-containing off-gas from titanium and magnesium production | 4.5. |

The mix was prepared as described in Example 1.

| | |
|---|---|
| fluidity | 59 mm |
| moisture capacity | 38.5%. |

In the production of clinker using this raw mix, the temperature at which the clinker formation process was completed was lowered from 1500° C. to 1390° C., the strength of clinker produced from this raw mix was 555 kgf/cm$^2$.

EXAMPLE 3

A raw mix for the production of portland cement clinker having the following composition (% by weight) was prepared:

| | |
|---|---|
| limestone | 52 |
| clay | 7.5 |
| pyrite cinder | 1.5 |
| hydrolysis and yeast production waste liquors | 30 |
| products of neutralization of chlorine-containing off-gas from titanium and magnesium production | 9.0 |

The mix was prepared as described in Example 1. The resultant raw mix had the following properties:

| | |
|---|---|
| fluidity | 60 mm |
| moisture capacity | 39% |

In the production of clinker using this raw mix, the temperature at which the clinker formation process was completed was lowered from 1500° C. to 1360° C., the strength of clinker produced from this raw mix was 565 kgf/cm$^2$.

We claim:

1. A raw mix composition for the production of portland cement clinker, consisting of a lime component, a clay component, an iron-containing component, and a modifying additive which comprises hydrolysis and yeast production waste liquors and products of neutralization of chlorine-containing off-gas from titanium and magnesium production, with the following proportions of components (% by weight):

| | |
|---|---|
| lime component | 50–52 |
| clay component | 7.5–10 |
| iron-containing component | 1–1.5 |
| hydrolysis and yeast production waste liquors | 30–38 |
| products of neutralization of chlorine-containing off-gas from titanium and magnesium production | 1–9. |

2. The raw mix composition of claim 1, wherein the lime component is selected from the group consisting of limestone, chalk, and marl.

3. The raw mix composition of claim 1, wherein the iron-containing component is selected from the group consisting of pyrite cinder and ore dust.

* * * * *